United States Patent Office 3,272,851
Patented Sept. 13, 1966

3,272,851
PURIFICATION OF ACYLATED
LANOLIN PRODUCTS
Conrad J. Sunde, Garden City, N.Y., and Thomas B. Richey, Jr., Westfield, N.J., assignors to Malmstrom Chemical Corp., Newark, N.J., a corporation of New Jersey
No Drawing. Filed July 24, 1963, Ser. No. 297,196
13 Claims. (Cl. 260—428)

This invention relates to a method of purifying acylated lanolin and lanolin products are derivatives and is more particularly concerned with a method for purifying products formed by the acetylation of lanolin and lanolin products or derivatives.

Lanolin and various derivatives thereof find extensive use in numerous products, such as cosmetics, pharmaceutical preparations, emulsions, and adhesives.

Lanolin consists of esters of carboxylic acids and higher alcohols. Generally speaking, lanolin exhibits a hydroxyl value of the order of 25 to 40, considered to be accounted for by the hydroxyls of the hydroxy ester content thereof.

Lanolin oil, consisting essentially of the low melting or liquid fraction of lanolin and produced by fractional crystallization of lanolin under controlled conditions of concentration, solvent and temperature, likewise contains a relatively high percentage of hydroxy esters, and generally speaking, exhibits a hydroxyl value of about 22 to 35. Similarly, ethoxylated lanolin and other ethoxylated lanolin products contain hydroxyl groups which account for the hydroxyl values thereof.

It is known that the hydroxyl groups of lanolin, lanolin oil, ethoxylated and other derivatives of lanolin containing hydroxyl groups are susceptible to the usual reactions of hydroxyl groups.

Thus, in U.S. patent to Conrad et al., No. 2,725,334, there is disclosed the acylation of lanolin as by reacting all or part of the hydroxyl groups thereof with acetic acid, acetic anhydride or acetyl chloride, whereby the lanolin hydroxy esters are converted into their acetyl derivatives, by the well-known Lewkowitsch procedure. The acetylation of lanolin as described in the above-mentioned Conrad et al. patent yields a modified lanolin possessing properties which render them more suitable than the unmodified lanolin for use in numerous instances.

As compared to the substantially incomplete solubility of lanolin in mineral oil even in very low concentrations, the products formed by the acetylation of lanolin are characterized by substantially complete solubility in mineral oil (of 70 viscosity) in concentrations up to 10% at 77° F. Products formed by acetylation of lanolin oil are completely soluble in mineral oil (of 70 to 350 viscosity) in concentrations up to 50% at 77° F., and in concentrations up to 30% at 50° F.

In order to purify the modified lanolin products above referred to, it is necessary that the reaction products resulting from the acylation of the lanolin be washed with water or other wash media to remove excess acylating agent, followed by removal of residual washing media, residual acid and side reaction materials, as by vacuum distillation. This necessary purification of the reaction products resulting from the acylation of the lanolin involves a cumbersome, time-consuming and costly procedure.

The principal object of the invention is to provide a method for treating acylation products of lanolin derivatives, particularly acetylated products of lanolin derivatives, by a procedure which will avoid the difficulties encountered and reduce the time consumed in the conventional methods of purification of such products.

Another object of the invention is to provide a continuous method for the purification of acylated products of lanolin derivatives, which will serve simultaneously to eliminate odoriferous constitutents thereof.

A more specific object of the invention is to provide a continuous process for the purification of acetylated products of lanolin derivatives by the removal of impurities such as acetic acid, acetic anhydride and odoriferous side reaction products as well as the original odor of lanolin.

Still another object of the invention is to provide a method for purification of acetylated products of lanolin derivatives, as aforesaid, under conditions which prevent heat degradation of the acetylated products such as frequently occurs in the presently known batch method of purification by reason of the relatively long period of treatment required to obtain the same degree of purification.

For the sake of brevity, the term "lanolin derivatives" herein means and includes lanolin, lanolin oil, hard waxy fractions of lanolin obtained in the manufacture of lanolin oil, lanolin or wool grease acids, lanolin or wool grease alcohols, ethoxylated lanolin, ethoxylated lanolin products, and other derivatives of lanolin containing hydroxyl or amine groups.

In accordance with the invention, the aforementioned objects thereof may be achieved, briefly stated, by subjecting the acylated lanolin derivatives, in the form of a slowly moving, whirling or so-called "wiped film," of relatively minute thickness, to contact with a heated surface while held under vacuum, and simultaneously subjecting the thus moving, heated film to the stripping action of a counter-current flow of steam.

We have found, in accordance with the invention, that by utilizing the principle of the so-called "wiped film" evaporator wherein relatively high speed blades, vanes or brushes serve to swirl or whirl the thin film of the feed material moving along a heated surface, almost instantaneous heat transfer to the thin liquid film is effected, while simultaneously where is provided good contact with stripping steam, thus enabling the thin film to be purged of volatile impurities.

In the case of acetylated lanolin derivatives, purification thereof by removal of acetic acid, acetic anhydride, odoriferous side reaction products and original odor of lanolin may be effected in a matter of five to fifteen seconds contact time with the stripping steam, while flowing as a thin, turbulent film along the heated surface and held under vacuum. As a result, considerably less heat degradation occurs during the purification than is the case in the conventional batch method of purification of acetylated lanolin derivatives. Moreover, the method of purification according to the invention is considerably more economical than the present conventional method, since it requires less operating time and labor, less water for washing, and does not require the use of air or inert gas as a purge to remove acetic acid vapors.

In the practise of the invention, the method for the purification of acylated lanolin derivatives may be carried out in any suitable form of so-called "wiped film" evaporator. One form of such evaporator preferably employed in the practice of the invention is that known as the Rodney-Hunt "Turba-Film" Evaporator. Other forms of such apparatus which may be utilized are those known as the "Pfaudler" Wiped Film Evaporator; the "Luwa" Thin Layer Evaporator; and the "Kontro" Evaporator.

The Rodney-Hunt "Turba-Film" Evaporator referred to above, consists essentially of a jacketed vertical tube wherein rotating blades or vanes are arranged so as to operate with their peripheries in close proximity, i.e., of the order of 30 thousandths of an inch, to the heated jacket. The jacket may be heated by steam or "Dowtherm." The liquid to be treated is fed into one end of the tube and moves along the heated surface thereof in the form of a film which is whirled peripherally at a high rate, in the form of a film of relatively minute thickness, and is thus heated up very rapidly to the temperature of the inner wall of the jacket. The turbulent, whirling thin film created by the action of the rotating blades or vanes is centrifugally held in contact with the inner wall of the tube while flowing by gravity down through the tube to the outlet thereof. The liquid fed through the apparatus accordingly has a low residence time therein, which together with the turbulent motion of the thin film, prevents localized overheating such as may cause degradation of the purified product.

In accordance with the invention, steam is fed into the tube so as to flow in a direction generally counter-current to that of the feed material as the latter moves downwardly along the jacket heated surface and is discharged therefrom, along with the volatilized impurities, through an entrainment separator having a suitable vapor exit leading to a condenser connected to a source of vacuum. The purified product is discharged through a suitable outlet at the bottom of the tube.

In the practise of the invention, the conditions of operation may be varied considerably, depending primarily upon the nature or constituency of the acylated lanolin derivatives to be purified, including the nature and intensity of its retained original odor of lanolin. Thus, for the purification of acetylated lanolin derivatives, the jacket temperature may vary from about 250° F. to about 450° F.; the vacuum may vary from 1.0 mm. Hg up to 50 mm. Hg, preferably 3 to 10 mm. Hg, absolute; the feed rate of the acetylated lanolin derivative may vary from 10 to 50, perferably 15 to 30, pounds per hour per square foot of heating surface; and the flow rate of stripping steam may vary from about 3 to 30 pounds, preferably 10 to 15 pounds, per 100 pounds of product.

Before setting forth specific examples illustrating the practise of the invention, the following data is given as an example, for comparative purposes, of the conventional batch method of purifying an acetylated lanolin.

CONVENTIONAL METHOD

A batch of 67.5 pounds of liquid lanolin was treated with 15.5 pounds acetic anhydride at 278° F., for 70 minutes. After cooling the reaction product to 125° F., the material was washed by adding 15 gallons of water thereto and heating the mixture to 200° F. while agitating the same, and then allowed to settle. The water was then removed. This washing operation was repeated six times, each wash requiring 1½ hours. Upon completion of the six washes, the material was dried by passing air through the mass at 15″ to 20″ Hg vacuum. Due to the wetness of the material, about six hours of air drying was necessary before the material became dry. The total time required for purifying the acetylated product accordingly amounted to approximately fifteen hours.

The following specific examples illustrate the practise of the invention according to preferred embodiments thereof. In each of these examples, there was employed, for the purification of the reaction mixture of the acetylated lanolin derivative, Rodney-Hunt "Turba-Film" Evaporator having a heat transfer area of 4 square feet.

Example 1

170 pounds of liquid lanolin material known by the trademark "Lantrol" was reacted with 36 pounds of acetic anhydride for 70 minutes at 285° F. in an agitated, 30 gallon stainless steel reaction vessel. The reaction products were cooled to 60° F. in an hour. The reaction products were then fed to the above-mentioned Rodney-Hunt "Turba-Film" unit at a rate of 75 pounds per hour (18.75 pounds per hour per square foot of heating surface). The jacket temperature was 350° F., a vacuum of 6 mm. Hg was maintained in the tube, and stripping steam was fed thereto at a rate of 14 pounds per hour. The product obtained as a result of this steam stripping run in the "Turba-Film" unit had a slight acetic acid type odor. This product was again passed through the "Turba-Film" unit at the same rate and at the same conditions of jacket temperature and rate of feed of stripping steam, as in the first pass, but under a vacuum of 5 mm. Hg in the tube. The product of the second pass through the "Turba-Film" unit was completely odorless and did not retain original odor of lanolin or of acetic acid.

Example 2

150 pounds liquid lanolin was reacted with 32 pounds of acetic anhydride in an agitated stainless steel, 30 gallon reaction vessel for one hour at 285° F. Then 20 gallons of water was added to the reaction products and the mixture was heated and agitated at 200° F. After settling, the water layer was drawn off and the grease layer was fed to the "Turba-Film" at a rate of 100 pounds per hour. Stripping steam was fed thereto at a rate of 14 pounds per hour. The jacket temperature was 350° F. and a vacuum of 5 mm. Hg was maintained in the tube. The product of "Turba-Film" run was free of acetic acid and lanolin odor.

Example 3

84 pounds of lanolin wax commercially known by the trademark "Lanfrax" was reacted with 30 pounds acetic anhydride in an agitated stainless steel kettle for 65 minutes at 275° F. The reacted materials were cooled at 120° F., 15 gallons of water was added and the mixture was heated to 210° F., with agitation. After mixing 10 minutes, the material was allowed to settle and the water layer was drawn off to waste. The upper layer was washed once more, as described, and after drawing off the water, the grease layer was passed through the "Turba-Film" unit at the rate of 105 pounds per hour and stripping steam was fed thereto at a rate of 14 pounds per hour. The jacket temperature was maintained at about 350° F. and a vacuum of 6 mm. Hg was maintained in the tube. The thus purified product was free of objectionable odor.

Example 4

90 pounds of purified (distilled) wool grease fatty acids were reacted with 25 pounds acetic anhydride, in an agitated 30 gallon stainless steel kettle for 65 minutes at 285° F. The reacted materials were cooled to 120° F. and 15 gallons of water were added and the mixture was heated to 210° F. with agitation. After settling 60 minutes, the water was drawn off to waste. The grease layer was given another water wash as above described, allowed to settle, and the water layer drawn off. The grease layer was then passed through the "Turba-Film" unit at the rate of 100 pounds per hour and stripping steam was fed thereto at a rate of 14 pounds per hour. The jacket temperature was 350° F. and a vacuum of 6 mm. Hg was maintained in the tube. The odor of the thus purified product was good.

Example 5

80 pounds of wool wax alcohols were acetylated with 80 pounds of acetic anhydride in an agitated 30 gallon stainless steel kettle for 70 minutes at 280–285° F. The resultant mixture was cooled to 150° F. Then 5 to 10 gallons of water were added and the mixture was heated to 210° F. with agitation. After settling 30 minutes, the water layer was drawn off. The upper layer was again washed as above described. The upper layer was then passed through the "Turba-Film" unit at a rate of 100 pounds per hour and stripping steam was fed thereto at a rate of 14 pounds per hour, while maintaining a jacket temperature of 350° F. and a vacuum of 6 mm. Hg in the tube. The product was light in color and had a good odor.

Example 6

90 pounuds of ethoxylated lanolin (1:55 weight ratio ethylene oxide to lanolin) were acetylated with 38 pounds of acetic anhydride in a 30 gallon stainless steel kettle for 90 minutes at 275–300° F. A part of the unreacted acetic anhydride and acetic acid was flashed off at a vacuum of 100 mm. Hg. After cooling the remaining reactants to 75° F., they were fed to the "Turba-Film" unit at a rate of 100 pounds per hour. The jacket temperature was 350° F., a vacuum of 6 mm. Hg was maintained in the tube, and the stripping steam was fed into the tube at a rate of 15 pounds per hour.

*Example 7*

90 pounds of ethoxylated lanolin alcohols (2:1 weight ratio ethylene oxide to lanolin alcohol) were acetylated with 55 pounds of acetic anhydride at 290° F. for 65 minutes in an agitated 30 gallon stainless steel vessel. Part of the unreacted acetic anhydride and acetic acid was flashed off at 100 mm. vacuum, allowing the temperature of the reactants to cool to 260° F. The reactants were then cooled to 110° F. and fed to the "Turba-Film" unit at the rate of 100 pounds per hour. Stripping steam was fed into the tube at a rate of 14 pounds per hour. The jacket temperature was 350° F. and a vacuum of 6 mm. Hg was maintained in the tube.

*Example 8*

80 pounds of ethoxylated (5.5 parts ethylene oxide) lanolin wax known commercially as "Lanfrax," were acetylated with 25 pounds of acetic anhydride at 290–295° F. in an agitated 30 gallon stainless steel vessel for 63 minutes. The remaining unreacted acetic anhydride and acetic acid was flashed off at 100 mm. vacuum while the reaction mass cooled to 260° F. After cooling to 100° F., the reaction mixture was fed to the "Turba-Film" unit at a rate of 100 pounds per hour. Stripping steam was fed into the tube at a rate of 14 pounds per hour. The jacket temperature was 350° F. and a vacuum of 6 mm. Hg was maintained in the tube.

Analysis of the acetylated lanolin derivatives referred to in the above examples, before and after purification thereof by the procedure, according to the invention, as illustrated in the respective examples, shows hydroxyl values and saponificaion values given in the following table:

TABLE I

| Material Acetylated | Hydroxyl Value | | Saponification Value | |
|---|---|---|---|---|
| | Before | After | Before | After |
| Lanolin Conventional Batch Method | 28.2 | 3.6 | 102.6 | 125.4 |
| Ex. 1, Lanolin oil | 30.0 | 2.2 | 98.5 | 124.0 |
| Ex. 2, Lanolin oil | 29.0 | 2.8 | 100.4 | 122.7 |
| Ex. 3, Lanolin wax | 25.9 | 0.9 | 98.1 | 119.7 |
| Ex. 4, Lanolin fatty acids | 42.6 | 1.0 | 164.4 | 196.6 |
| Ex. 5, Lanolin alcohols | 150.6 | 3.5 | 4.3 | 143.2 |
| Ex. 6, Ethoxylated lanolin | 54.8 | 0 | 14.3 | 68.0 |
| Ex. 7, Ethoxylated lanolin alcohols | 63.7 | 3.2 | 3.2 | 71.2 |
| Ex. 8, Ethoxylated lanolin wax | 14.6 | 0 | 14.0 | 29.2 |

Although in the above description and examples, the invention is specifically illustrated as applied to the purification of acetylated lanolin derivatives, it should be evident that the invention will be likewise useful and advantageous for the purification of other acylated lanolin derivaties, such as those obtained by reacting lanolin derivatives with propionic anhydride, benzoic anhydride, etc. as mentioned in the Conrad et al. patent referred to above.

What is claimed is:

1. The method of purifying reaction products resulting from acylation of a lanolin material and having a hydroxyl value of from about 15 to about 150, said material being selected from the group consisting of lanolin, lanolin oil, lanolin wax, lanolin fatty acids, wool grease acids, lanolin alcohols, wool grease alcohols, ethoxylated lanolin, ethoxylated lanolin alcohols, ethoxylated lanolin wax and lanolin derivatives containing amine groups, said method comprising continuously feeding said products of acylation into contact with the surface of the inner wall of a heated jacket, causing the feed material to flow downwardly along the surface of said wall to be heated thereby while in the form of a wiped film of relatively minute thickness, said film being formed by a wiping action which imparts turbulence to said film and causes it to spiral as it flows downwardly along said surface, subjecting said film to a vacuum in the range of from about 1.0 to about 50 mm. mercury absolute, while thus heated, and simultaneously subjecting the thus flowing heated film to the action of a counter-current flow of steam, whereby to remove excess acylating agent and simultaneously eliminate odoriferous constituents from said products.

2. The method defined in claim 1, wherein the feed material is an acetylated lanolin derivative.

3. The method defined in claim 1, wherein said lanolin material has a hydroxyl value of about 22 to 40.

4. The method defined in claim 1, wherein said lanolin material is a lanolin wax.

5. The method defined in claim 1, wherein said lanolin material is a lanolin oil.

6. The method defined in claim 1, wherein said lanolin material is composed of lanolin alcohols.

7. The method defined in claim 1, wherein said lanolin material is composed of lanolin fatty acids.

8. The method defined in claim 1, wherein said lanolin material is an ethoxylated lanolin.

9. The method defined in claim 1, wherein said lanolin material is composed of ethoxylated lanolin alcohols.

10. The method defined in claim 1, wherein said lanolin material is an ethoxylated lanolin wax.

11. The method as defined in claim 10, wherein said acylated lanolin material is an acetylated reaction product.

12. The method as defined in claim 1, wherein said surface is heated to a temperature in the range of 250° F. to 550° F., the rate of flow of the steam is in the range of 3 to 30 pounds per pound of product, and the rate of feed of said lanolin material is in the range of 10 to 50 pounds per hour per square foot of said heated surface.

13. The method as defined in claim 12, wherein said temperature is approximately 350° F., said vacuum is approximately 5 mm. Hg absolute, said rate of flow of steam is approximately 14 pounds per pound of product, and said rate of feed of the acetylated lanolin material is approximately 18 to 25 pounds per square foot of said heated surface.

References Cited by the Examiner

UNITED STATES PATENTS 1,498,389   6/1924   LaBour _____ 260—428
1,622,126   3/1927   Wecker _____ 260—428

CHARLES B. PARKER, *Primary Examiner.*

ANTON H. SUTTO, *Assistant Examiner.*